(12) United States Patent
Bailey

(10) Patent No.: US 9,175,702 B1
(45) Date of Patent: Nov. 3, 2015

(54) EXTERNALLY SUPPORTED FOIL WITH REVERSIBLE CAMBER AND VARIABLE CHORD LENGTH

(76) Inventor: Stephen Lee Bailey, Los Gatos, CA (US)

( * ) Notice: Subject to any disclaimer, the term of this patent is extended or adjusted under 35 U.S.C. 154(b) by 839 days.

(21) Appl. No.: 13/475,773

(22) Filed: May 18, 2012

Related U.S. Application Data

(60) Provisional application No. 61/489,620, filed on May 24, 2011.

(51) Int. Cl.
*F03D 7/02* (2006.01)
*F15D 1/00* (2006.01)

(52) U.S. Cl.
CPC .................. *F15D 1/00* (2013.01); *F03D 7/022* (2013.01); *F03D 7/0236* (2013.01)

(58) Field of Classification Search
CPC ......... F03D 3/062; F03D 3/064; F03D 7/022; F03D 7/0224; F03D 7/0236; F03D 7/024
USPC ................................ 416/81, 132 A, 140, 240
See application file for complete search history.

(56) References Cited

U.S. PATENT DOCUMENTS

| | | | |
|---|---|---|---|
| 535,504 A * | 3/1895 | Milliken | 416/81 |
| 1,266,472 A * | 5/1918 | Howe | 416/16 |
| 1,341,758 A | 7/1919 | Parker | |
| 3,332,383 A | 7/1967 | Wright | |
| 3,753,415 A * | 8/1973 | Burtis | 114/126 |
| 3,995,170 A * | 11/1976 | Graybill | 290/55 |
| 4,049,362 A * | 9/1977 | Rineer | 416/119 |
| 4,191,507 A * | 3/1980 | DeBerg | 416/117 |
| 4,208,168 A * | 6/1980 | Chen et al. | 416/132 B |
| 4,341,176 A * | 7/1982 | Orrison | 114/102.22 |
| 4,457,669 A * | 7/1984 | Corry | 416/119 |
| 4,494,007 A * | 1/1985 | Gaston | 290/44 |
| 4,530,642 A * | 7/1985 | Yang | 416/119 |
| 4,537,143 A | 8/1985 | Gaide | |
| 4,545,729 A * | 10/1985 | Storm | 416/132 B |
| 4,619,585 A * | 10/1986 | Storm | 416/132 B |
| 5,131,805 A * | 7/1992 | Stevenson | 415/1 |
| 5,181,678 A | 1/1993 | Widnall | |
| 5,226,806 A * | 7/1993 | Lubbers | 416/132 B |
| 6,173,925 B1 | 1/2001 | Mueller | |
| 6,347,769 B1 | 2/2002 | To | |
| 6,622,974 B1 | 9/2003 | Dockter | |
| 7,939,178 B2 | 5/2011 | Sar | |
| 7,963,485 B2 | 6/2011 | Koneczny | |
| 8,016,249 B2 | 9/2011 | Sar | |
| 8,056,853 B2 | 11/2011 | Eisentraut | |
| 8,113,470 B1 | 2/2012 | Motosko | |
| 8,128,376 B2 | 3/2012 | Karem | |
| 2010/0090067 A1 | 4/2010 | Pfaller | |

\* cited by examiner

*Primary Examiner* — Sean J Younger

(57) ABSTRACT

An externally supported foil with reversible camber and variable chord length is described that allows a thin foil of efficient deformed shape to generate lift equally on opposite angles of attack to a fluid flow. The foil is supported at the leading and trailing edges to ribs that are in turn connected to spanwise spars forming an external structure attachable to a body. The foil is held by leading edge hinge(s) and trailing edge elastic membrane(s) along the span or at the ribs. Membrane pretension keeps the foil taut while generating no lift when parallel to a flow. When rotated by an external mechanism to generate an angle of attack, the membrane stretches due to the differential pressures generated on the foil surface; thereby, passively increasing the chord length and camber. Rib cutouts dictate the deformed aerodynamic or hydrodynamic foil shape that then generates lift.

1 Claim, 1 Drawing Sheet

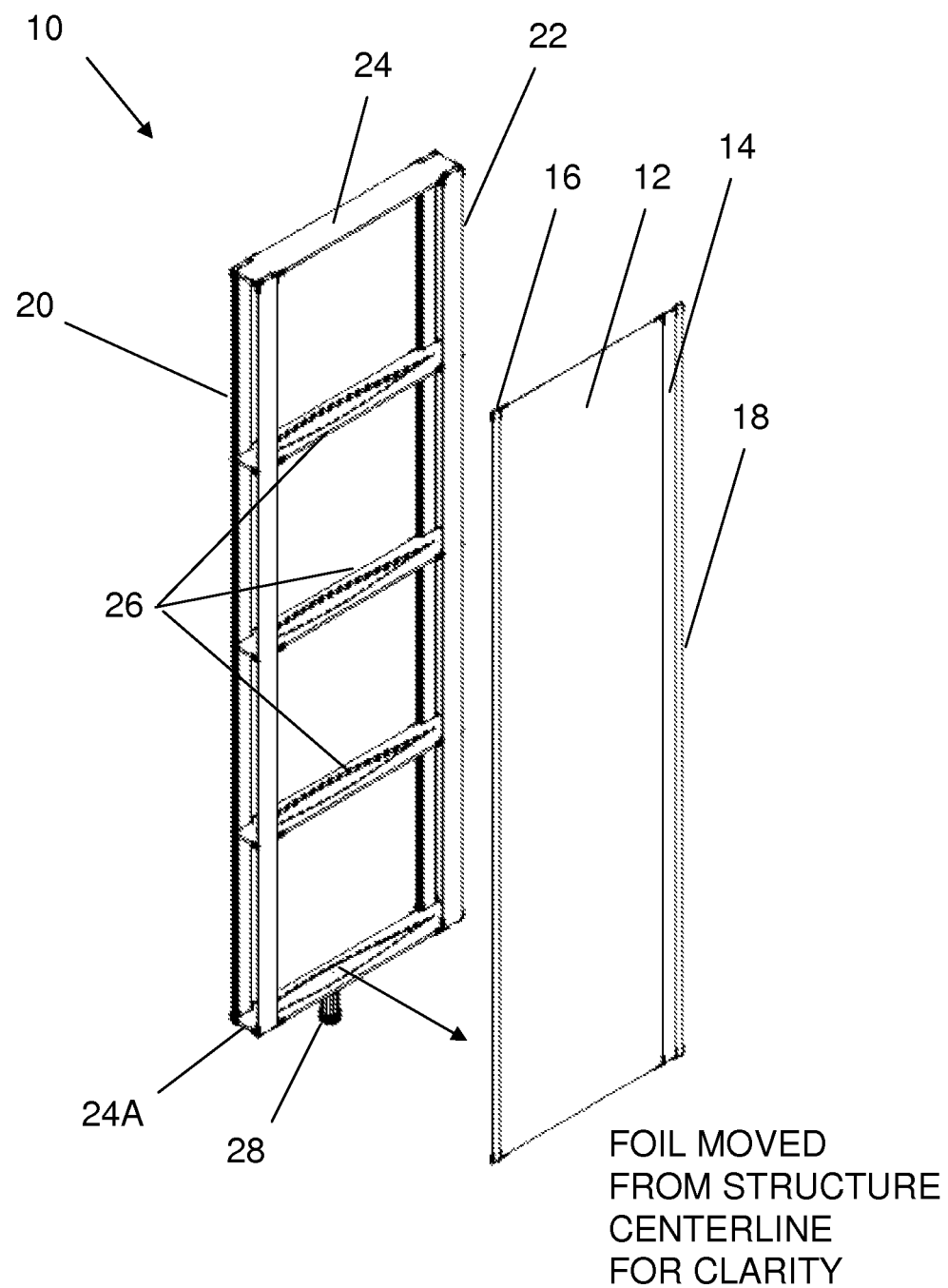

EXTERNALLY SUPPORTED FOIL WITH REVERSIBLE CAMBER AND VARIABLE CHORD LENGTH

CROSS-REFERENCE TO RELATED APPLICATIONS

This application claims the benefit of provisional patent application 61/489,620 filed 2011 May 24 by the present inventor.

FEDERALLY SPONSORED RESEARCH

None.

SEQUENCE LISTING

None.

BACKGROUND

Prior Art

The following is a tabulation of some prior art that presently appears relevant:

| Pat. No. | Issue Date | Patentee |
|---|---|---|
| 1,341,758 | Jun. 1, 1920 | Parker |
| 3,332,383 | Jul. 25, 1967 | Wright |
| 4,537,143 | Aug. 27, 1985 | Gaide |
| 5,181,678A | Jan. 26, 1993 | Widnall, et al. |
| 6,173,925B1 | Jan. 16, 2001 | Mueller, et al. |
| 6,622,974B1 | Sep. 23, 2003 | Dockter, et al. |
| 2010/0090067A1 | Apr. 15, 2010 | Pfaller |
| 7,939,178B2 | May 10, 2011 | Sar, et al. |
| 7,963,485B2 | Jun. 21, 2011 | Koneczny |
| 8,113,470B1 | Feb. 14, 2012 | Motosko |

Foils are utilized in a variety of aerodynamic and hydrodynamic applications including aircraft wings, ship and aircraft rudders, and sailboat sails and centerboards. In the former, aircraft main wings typically produce an upward lift. In the latter, rudders, sails, and centerboards require forces equal in magnitude in the opposite directions to a fluid flow for propulsion or control.

The state of the art in wing and sail designs for aircraft, sailboats and other aerodynamic and hydrodynamic machines contains numerous examples of foils designed for variable shape to improve lift under varying conditions. The variable shape may be manifested in the form of external devices, ie. leading and trailing edge flaps, slats, and other devices. The variable shape may also be manifested in a change to the shape of the foil itself. The mechanisms for producing the change in shape are both actively and passively actuated. Both approaches typically suffer from the complexity of active mechanisms operating under high loads; thereby, negatively impacting the producibility, cost, reliability, and maintenance of the foil.

The variable foil shape designs described in the literature and cited references typically contain internal mechanism(s) developed to alter the exterior shape of a rigid or elastic foil. Developing an actuating mechanism within the confines of an efficient airfoil shape, while still providing the structural strength and rigidity, becomes problematic. Increasing the thickness of the foil to accommodate the mechanism results in lower lift and higher drag, ie. poor foil efficiency. Reducing the foil thickness while accommodating the mechanism leaves little space for structure, ie. poor robustness and structural reliability for the foil.

BRIEF SUMMARY OF INVENTION

An externally supported foil with reversible camber and variable chord length is described that allows a thin foil of efficient deformed shape to generate lift equally on opposite angles of attack to a fluid flow. The external structure supports the foil while providing the NACA or equivalent offsets to shape the foil when the foil deformed under the pressures generated exposed to an aerodynamic or hydrodynamic flow field. Compared to the state of the art, the structure of the foil is turned "inside-out" with an external structure surrounding the foil and providing the shape of the foil as it passively conforms to said structure by aerodynamic or hydrodynamic fluid flow. The structure supporting the foil being external to the foil shape overcomes the limitations of the current state-of-art limiting the space available for adequate structure to support the foil loads. The parasitic drag can be reduced with proper shaping of this external structure, while providing of function similar to a "wing fence and "wing endplate" to the benefit of foil efficiency. Because the foil shape is created passively when the foil is exposed to a flow, no form of active actuation mechanism is required within the foil. Some form of mechanism external to this invention is required to rotate and hold the foil at an angle of attack to the fluid flow; however, removing this function from the foil simplifies its design.

DESCRIPTION OF DRAWINGS

FIG. 1 is an isometric view of the externally supported foil with reversible camber and variable chord length. The foil components are offset from the centerline of the external support structure in the drawing for clarity.

DETAILED DESCRIPTION

An externally supported foil with reversible camber and variable chord length 10 is described that allows a thin foil 12 when deformed to an efficient shape to generate lift equally on opposite angles of attack to a fluid flow. The foil 12 is a flat, thin plate that may be semi-rigid or rigid in-plane, but is flexible out of plane along its span. The foil 12 is supported by a pivoting hinge supported leading edge 16 and trailing edge support 18 tensioned between the endcaps 24 and 24A or intermittently supported at the ribs 26 of the external supporting structure. The external structure consists of spars 20 and 22 of shape to minimize parasitic drag connected by open ribs 26 and the endcaps 24 and 24A. The endplates 24 and 24A also function as both wing endplates and the structural attachment to the aircraft, watercraft, or other body. Ribs 26 connect between the spars with an open cutout area provided for the foil 12 and membrane band 14. The perimeter of the cutout forms the maximum deformed shape for the foil 12 and membrane band 14. The structure provides the strength and rigidity under foil load and provides the means to transfer the forces and moments into the body via a pivot shaft 28 for propulsion and/or control. A linear membrane band 14 is attached along the trailing edge 18 that is pre-stretched to keep the foil 12 taut. The foil leading edge 16 is held under spanwise tension and may pivot about its axis. When the support structure is parallel to the fluid flow such as when weathervaning, the foil 12 shape is pulled by the pre-stretched membrane band 14 into a plane and no lift is generated. As the support structure is rotated to and held at an angle of attack to a fluid flow by some actuation mechanism not shown as a detail in the drawing, the membrane band 14 stretches and passively increases the chord length providing an aerodynamic or hydrodynamic shape for lift.

REFERENCE NUMERALS

10 externally supported foil with reversible camber
12 main foil
14 trailing edge elastic membrane band
16 leading edge pivoting support hinge
18 trailing edge elastic membrane connection
20 leading edge spar
22 trailing edge spar
24 endplate
24A endplate (shown with foil mounting structure)
26 rib with internal foil-shaped cavity
28 pivot shaft Operation FIG. 1 describes an externally supported foil with reversible camber and variable chord length 10. A thin foil 12 is held in a fluid flow by an external support structure surrounding said foil. As the structure is rotated to an angle of attack to the fluid flow by some form external actuation to the support pivot shaft 28, the membrane band 14 stretches along the trailing edge 18 increasing the chord length and creating a aerodynamic or hydrodynamic shape. The pivot shaft 28 is mounted forward of center of pressure and therefore the foil 12 will weathervane when actuation is released. When the foil 12 is parallel to the fluid flow the membrane band 14 pulls the foil taut and flat for low aerodynamic or hydrodynamic drag. If the structure is rotated to the opposite angle of attack, the membrane band 14 pulls the foil taut during rotation and then again stretches along the trailing edge 18 passively increasing the chord length and creating a aerodynamic or hydrodynamic shape with the lift force in the opposite direction.

The structural endcaps 24 and 24A also function as both wing endplates to improve the performance of the foil by preventing spanwise flow off the ends of the foil. The open space in the intermediate ribs 26 allows the foil 12 to reverse its camber shape from the leading edge 16 and trailing edge 18 while the perimeter of the opening provides a stop for the maximum foil deflection. The shape of the cutout would typically be, but is not limited to, NACA or equivalent foil offsets. When the foil 12 is fully deflected, the ribs 26 also function as wing fences on the foil 12 suction side as a result of their flat shape. Wing fences help to prevent the spanwise flow of air or water and can help to improve performance of the foil 12.

The invention claimed is:

1. An externally supported foil with reversible camber and variable chord length comprising:
   a main flat and thin foil, with
   an external structure supporting said foil consisting of spanwise spars and intermittent ribs, with said intermittent ribs developing an aerodynamic or hydrodynamic deformed shape of said foil while functioning like a wing fence on the suction side of said foil, with
   hinges on a leading edge of said foil to hold said foil while accommodating reversing of camber, with
   a trailing edge elastic membrane band providing variable chord length and holding said foil taut while reversing camber through its stretch, with
   spar end caps as part of said external structure while performing function of foil endplates and providing foundation for attachment of said foil to a propelled or controlled body,
   whereby, said foil changes in camber and chord length while rotated to an angle of attack by said external structure to a fluid flow to create a lift force.

\* \* \* \* \*